United States Patent
Glynn et al.

(10) Patent No.: US 6,298,667 B1
(45) Date of Patent: Oct. 9, 2001

(54) MODULAR COMBUSTOR DOME

(75) Inventors: Christopher Charles Glynn, Hamilton; Ely Eskenazi Halila, Cincinnati; John David Bibler, Mason, all of OH (US); David Byron Morris, Ft. Thomas, KY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/599,788

(22) Filed: Jun. 22, 2000

(51) Int. Cl.$^7$ ............................................. F02C 1/00
(52) U.S. Cl. .................. 60/737; 60/747; 60/39.821; 29/889.2
(58) Field of Search ................ 60/737, 739, 746, 60/747, 39.821, 39.36; 29/890.02, 889.2

(56) References Cited

U.S. PATENT DOCUMENTS

| | | |
|---|---|---|
| 5,263,325 * | 11/1993 | McVey et al. ................ 60/738 |
| 5,285,632 * | 2/1994 | Halila ........................... 60/39.31 |
| 5,323,604 | 6/1994 | Ekstedt et al. . |
| 5,511,375 | 4/1996 | Joshi et al. . |
| 5,630,319 * | 5/1997 | Schilling et al. ............ 60/747 |
| 5,682,747 | 11/1997 | Brown et al. . |
| 5,816,049 | 10/1998 | Joshi . |
| 6,164,055 * | 12/2000 | Lovett et al. ................ 60/39.906 |

OTHER PUBLICATIONS

U.S. application No. 09/398,559, filed Sep. 17, 1999.
U.S. application No. 09/398,557, filed Sep. 17, 1999.

* cited by examiner

Primary Examiner—Charles G. Freay
(74) Attorney, Agent, or Firm—Andrew C. Hess; Rodney M. Young

(57) ABSTRACT

A combustor dome module includes a mixer tube having a hollow heat shield sealingly joined around the outlet end thereof. The modules may then be assembled in an array for defining the combustor dome, with each module being individually removable therefrom.

20 Claims, 5 Drawing Sheets

MODULAR COMBUSTOR DOME

This invention was made with Government support under Contract NAS3-27235, awarded by NASA.

BACKGROUND OF THE INVENTION

The present invention relates generally to gas turbine engines, and, more specifically, to combustors thereof.

A typical gas turbine engine combustor includes radially outer and inner annular combustion liners joined at forward ends to an annular dome. The combustor dome includes a plurality of carburetors for injecting a fuel and air mixture into the combustor which is burned for generating hot combustion gases. Incomplete combustion results in undesirable exhaust emissions including unburned hydrocarbons and nitrogen oxides (NOx).

Accordingly, gas turbine combustor art is quite crowded with various configurations of the basic combustor and individual carburetors for maximizing engine performance while reducing undesirable exhaust emissions with varying effectiveness.

A typical carburetor includes an air swirler which includes one or more rows of air swirling apertures or vanes that swirl compressor discharge air around fuel being injected centrally therein. Typical fuel injectors are configured to cooperate with the swirlers for finely atomizing the fuel to produce a suitable fuel and air mixture for undergoing combustion.

However, the available axial space or envelope in the combustor is a design constraint for maintaining the size, weight, and cost of the overall engine within limits, especially for an aircraft engine application where size and weight are critical design objectives. Accordingly, the ability to completely mix the injected fuel with the air prior to combustion is constrained by the available axial length.

Government mandated environmental regulations are increasingly limiting the permitted levels of undesirable exhaust emissions, including in particular the NOx levels. However, this is quite difficult since NOx and hydrocarbons emissions during the combustion process occur differently at different temperatures and are subject to the available residence time of the combustion gases inside the combustor.

A recent development program for a high speed civil transport (HSCT) aircraft engine includes a new type of combustor based on premixing of the fuel and air in an enclosed passageway prior to combustion for further reducing exhaust emissions, and in particular the NOx levels. Two recent U.S. patent applications for this new combustor are Ser. Nos. 09/398,557 and 09/398,559 filed concurrently on Sep. 17, 1999.

These types of combustors are configured as lean premix pressurized (LPP) combustors which include elongate integrated mixer flame holder (IMFH) mixer tubes that receive fuel at upstream inlet ends thereof which is mixed with air inside the respective tubes for being premixed over a substantial axial length prior to discharge into the combustion chamber. And, a row of pilot fuel injectors surrounds the combustor for cooperating with the primary fuel injectors and tubes to provide suitable combustor performance from idle to maximum power, while substantially reducing NOx emissions for the HSCT aircraft engine application.

However, since the mixer tubes are relatively long and are supported at opposite ends thereof, they are subject to substantial differences in external temperature during operation. The tube outlet ends are suspended from a dome casing, and are directly subject to the hot combustion gases produced downstream therefrom. And, the inlet ends of the tubes are supported in a relatively cold forward support plate.

In the development combustor, an array of the mixer tubes is brazed to a common heat shield segment. And, due to the substantial differential temperatures in the combustor dome, the tube brazes are subject to limited fatigue life as the tubes tilt or cock under differential expansion and contraction. Replacement of an individual mixer tube requires disassembly of the entire heat shield segment with its corresponding array of mixer tubes, with subsequent repair or replacement of the individual tubes. This is a relatively complex maintenance operation, and is expensive.

Accordingly, it is desired to provide an improved LPP combustor having a new configuration of the mixer tubes for improving combustor life and reducing maintenance complexity and costs.

BRIEF SUMMARY OF THE INVENTION

A combustor dome module includes a mixer tube having a hollow heat shield sealingly joined around the outlet end thereof. The modules may then be assembled in an array for defining the combustor dome, with each module being individually removable therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
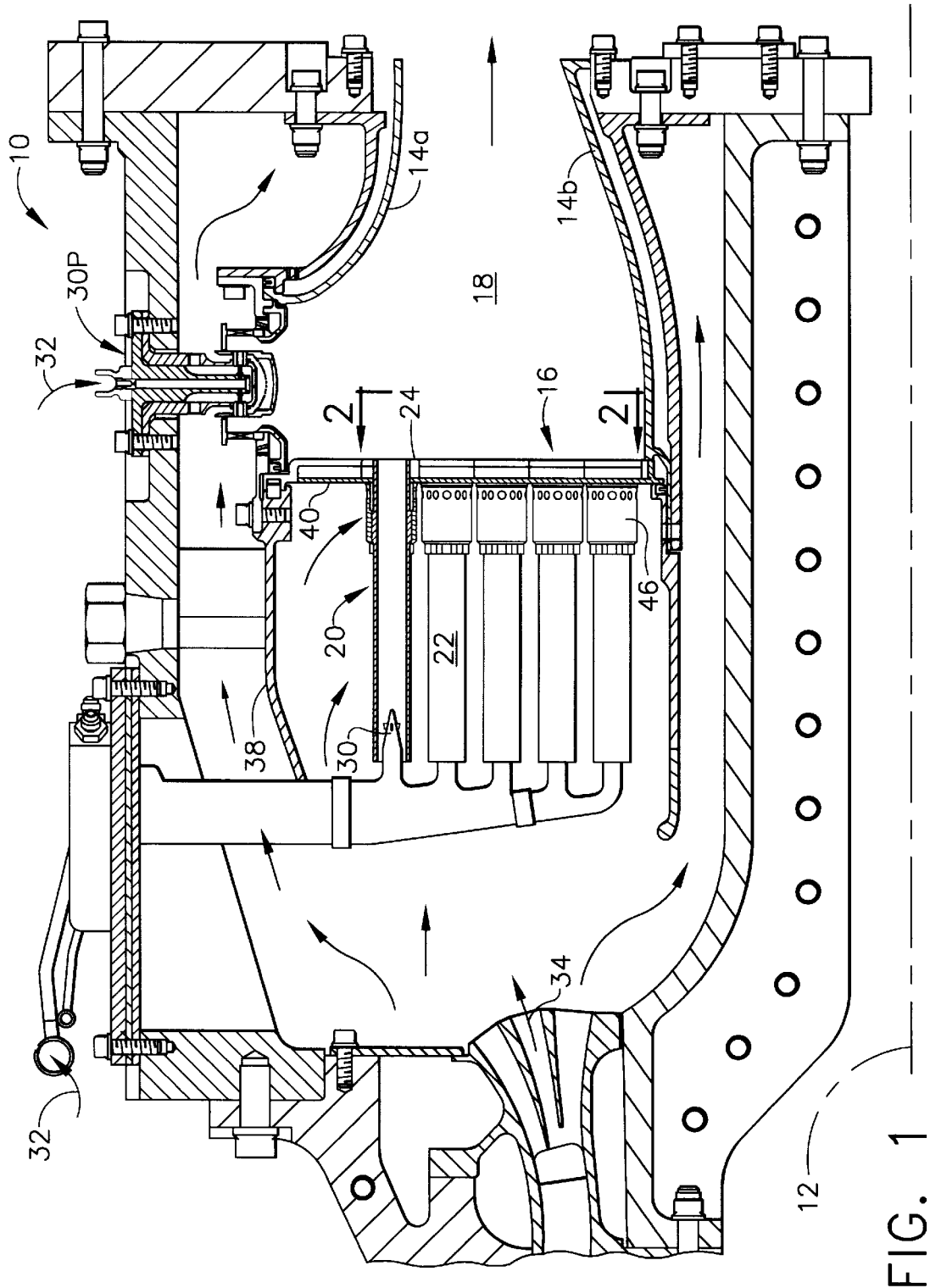
FIG. 1 is an axial sectional view of a low NOx combustor in accordance with an exemplary embodiment of the present invention.

Illustrated in FIG. 1 is a LPP low NOx combustor 10 in accordance with an exemplary embodiment of the present invention. The combustor is axisymmetrical about an axial centerline axis 12 of the gas turbine engine in which it powers corresponding turbine stages (not shown) for propelling an aircraft in flight.

The combustor includes radially outer and inner combustion liners 14a,b which are suitably joined to an annular combustor dome 16. The liners and dome cooperate to define an annular combustion chamber 18 about the centerline axis 12.

In accordance with the present invention, the dome 16 is modular and includes an array of individual dome modules 20. Each module includes an axially elongate mixer tube 22 having a corresponding, unitary heat shield 24 fixedly and sealingly joined to the distal end thereof. As additionally shown in FIG. 2, the individual heat shields 24 adjoin each other both radially and circumferentially in a coextensive or common plane in a tiled configuration facing the combustion chamber 18. The tiled heat shields define the forward end of the combustion chamber and protect the dome modules from combustion heat during operation.

Figure 3:
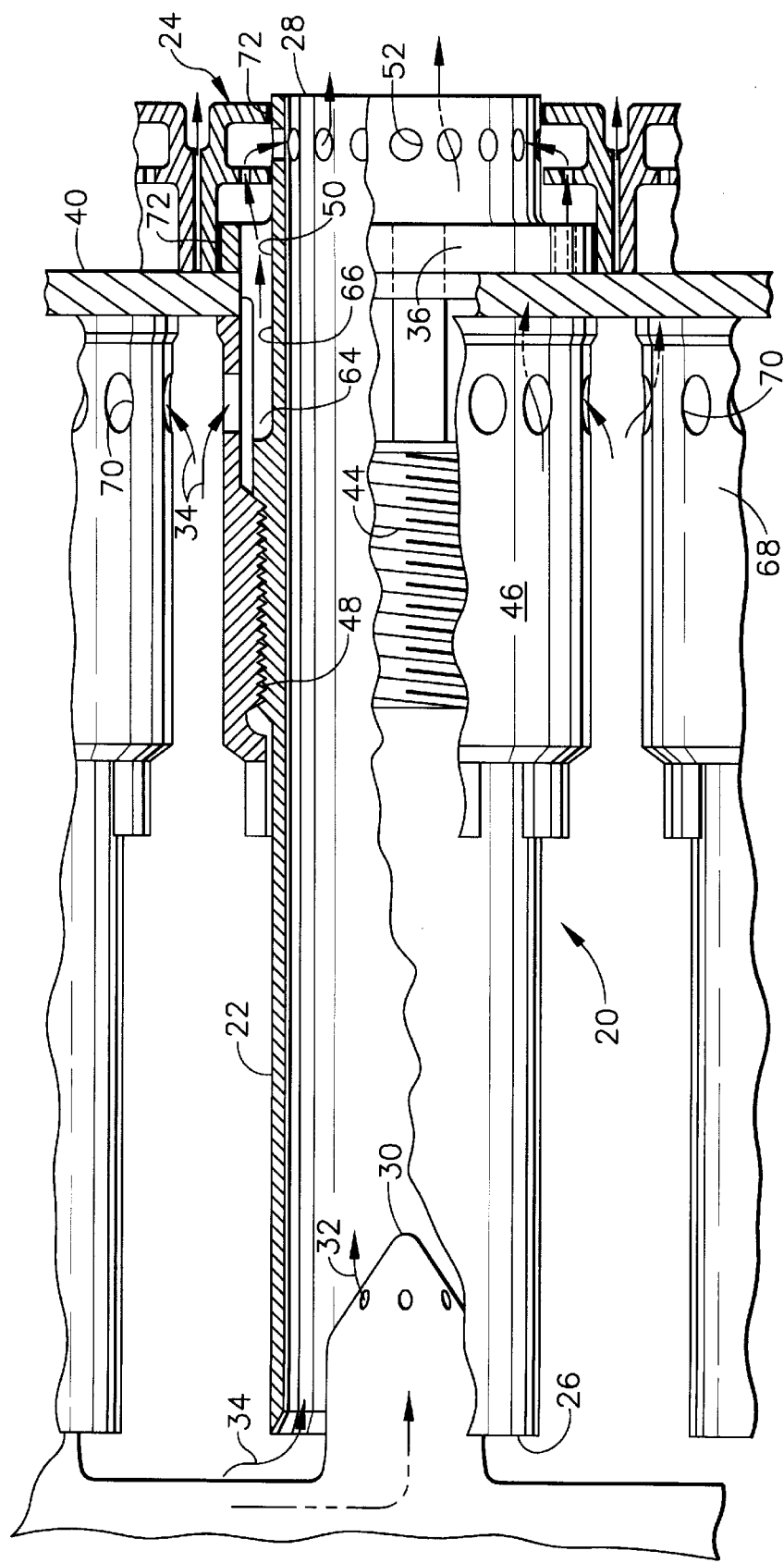
FIG. 3 is an enlarged partly sectional side view of the one of the combustor dome modules illustrated in FIG. 1 in accordance with an exemplary embodiment of the present invention.
Figure 4:
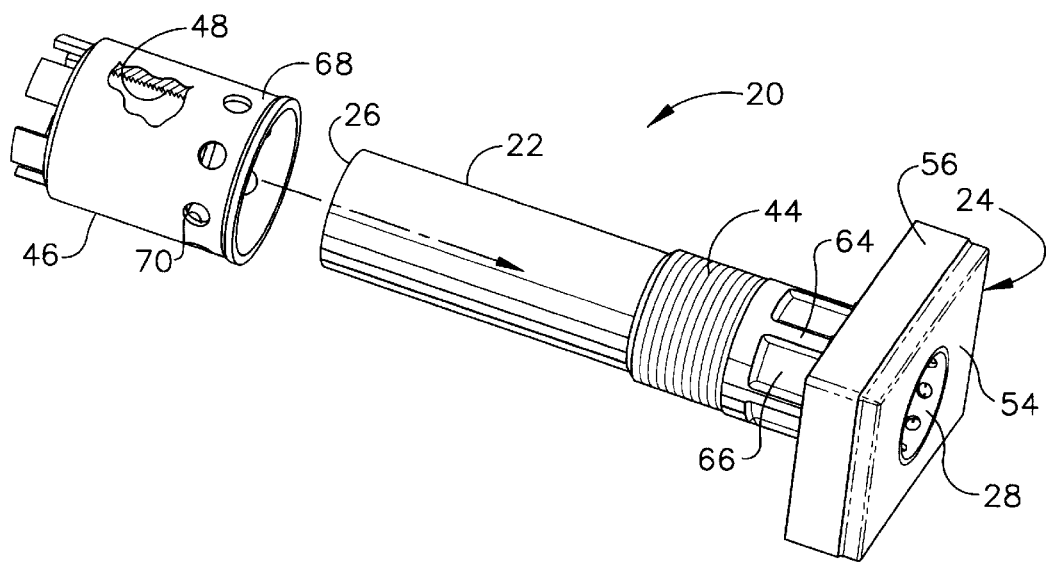
FIG. 4 is an exploded, isometric view of the combustor dome module illustrated in FIG. 3.

One of the dome modules 20 is illustrated in more detail in FIG. 3 installed in the dome assembly, and in isolated, exploded view in FIG. 4. The mixer tube 22 is axially elongate and extends between an inlet 26 at a proximal, forward end of the tube, and an outlet 28 at a distal, aft end of the tube. The tube inlet and outlet are defined by the opposite open ends of the tube itself and are coaxially aligned with each other in the exemplary cylindrical tube configuration illustrated.

As shown in FIGS. 1 and 3, a plurality of primary or main fuel injectors 30 extend from one of several common fuel stems, and are suspended in respective inlet ends of the corresponding tubes for injecting fuel 32 therein. The tube inlets 26 also receive pressurized air 34 from the compressor (not shown) of the engine which is premixed with the fuel inside the respective tubes to form a fuel and air mixture which undergoes combustion in the combustion chamber.

The main fuel injectors 30 cooperate with a plurality of pilot fuel injectors 30P surrounding the dome aft of the heat shields 24 as shown in FIG. 1. The pilot fuel injectors 30P introduce a pilot mixture of fuel and air at the forward end of the outer liner 14a and cooperate with the main source of fuel and air provided by the mixer tubes 22. The fuel and air channeled through the mixer tubes enjoys enhanced mixing and is preheated and vaporized for providing an enhanced fuel and air mixture into the combustion chamber for reducing undesirable exhaust emissions.

The length of the individual tubes is selected for maximizing the premixing of the fuel and air without undergoing auto-ignition therein. In this way, the fuel and air are allowed to thoroughly mix and vaporize in the individual tubes, and are heated therein prior to discharge into the combustion chamber. The mixture discharged from the individual tubes is ignited in the combustor and generates a flame extending aft from the corresponding heat shields. The individual tubes may therefore be referred to as an integrated mixer flame holder (IMFH) for providing enhanced performance, including the reduction of NOx emissions in the operating combustor.

The modular array of the mixer tubes 20 illustrated in FIG. 3 for example permits the individual installation and removal of the dome modules 20 without obstruction by the adjoining dome modules. This is made possible by incorporating an integral radial mounting flange 36 spaced forwardly from the tube outlet, with the heat shield 24 being sealingly joined around the tube between the mounting flange and the tube outlet.

As shown in FIGS. 1 and 3, the combustor dome further includes an annular dome casing 38 at the outer radius having an aft end from which integrally extends radially inwardly a perforate dome aft support plate 40 having corresponding apertures for supporting therein respective ones of the tube outlet ends. The dome casing and plate are preferably fully annular, but may be formed in a plurality of circumferentially adjoining arcuate segments.

In order to retain the individual mixer tubes in the dome plate, each tube as illustrated in FIGS. 3 and 4 preferably includes external threads 44 disposed axially between the tube inlet 26 and the mounting flange 36. A tubular retention nut 46 includes internal threads 48 which are sized for engaging the tube external threads 44.

In this way, the inlet ends of the individual tubes 22 may be simply inserted through the corresponding apertures in the dome plate 40 until the mounting flange 36 abuts the dome plate on one side thereof. The corresponding retention nuts 46 are assembled over the inlet ends of the tubes as they are being inserted through the dome plate.

The individual nuts 46 may be rotated to engage the external tube threads to abut the distal ends of the nuts against the back side of the dome plate 40, as shown in FIG. 3, for clamping the individual tubes to the dome plate. The nuts 46 may have a serrated or castellated proximal end for which a corresponding tool may be used for tightening the nuts in place, or later removing the nuts during a maintenance outage. In this way, the individual mixer tubes are fully supported at their aft ends only to the dome plate, and are clamped in place by the corresponding nuts 46 and cooperating mounting flanges 36.

Each dome module 20 is thusly supported on the aft dome plate 40 by cantilevering the corresponding mixer tube 22 therefrom at its outlet end, with its inlet end being freely suspended therefrom without other support.

Figure 5:
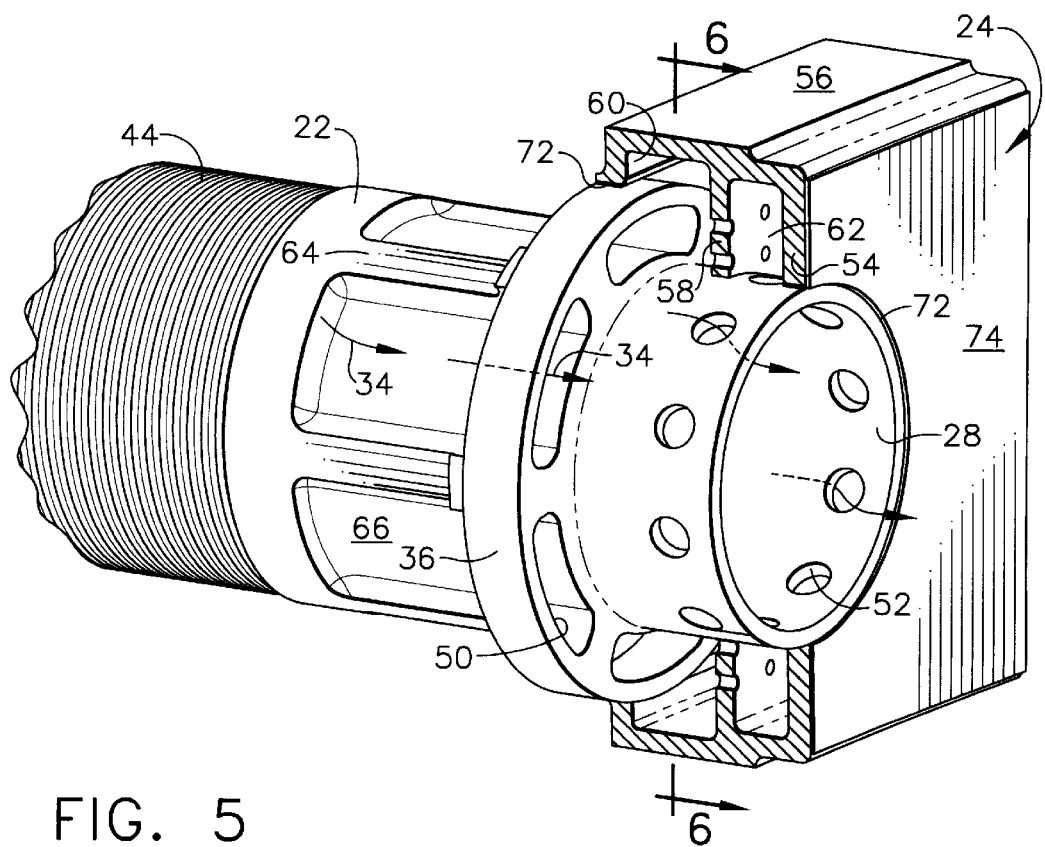
FIG. 5 is an enlarged, partly sectional isometric view of the outlet end of the dome module illustrated in FIG. 4.

As shown in FIG. 5, the individual heat shields 24 are hollow in the general form of closed boxes. In this way, a portion of the pressurized air 34 may be channeled therein for cooling the individual heat shields during operation. This is accomplished by providing a row of circumferentially spaced apart inlet ports 50 extending axially through the mounting flange 36 and disposed in flow communication with the inside of the heat shield for channeling the cooling air 34 therein.

The mixer tube correspondingly includes a row of circumferentially spaced apart radial outlet ports 52 disposed in flow communication with the inside of the heat shield 24 for discharging spent cooling air into the tube 22 itself upstream from the outlet 28 thereof. In this way, the air used for cooling the heat shields is reintroduced into the individual mixer tubes for mixing with the fuel and air mixture therein prior to discharge from the tube outlets. This reduces NOx and hydrocarbon emissions as compared to directly discharging the spent cooling air directly into the combustor.

FIG. 5 illustrates a preferred embodiment of the heat shield 24. The heat shield includes an imperforate shield plate 54 having a central bore sealingly joined around the mixer tube 22 at the outlet 28 thereof. The heat shield is preferably a quadrilateral box for radially and circumferentially adjoining adjacent heat shields. The heat shield includes an outer wall or border 56 integrally joined to the perimeter of the shield plate 54, and extends to and is sealingly joined to the mounting flange 36.

Figure 6:
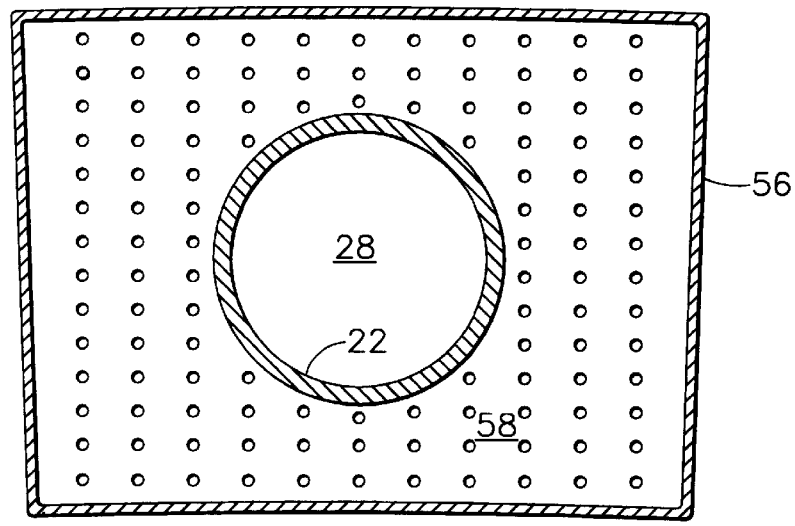
FIG. 6 is a radial sectional view through a portion of the heat shield illustrated in FIG. 5 and taken along line 6—6.

A perforate impingement baffle 58 extends inwardly from the border 56 and is spaced from the shield plate 54 for channeling the cooling air 34 from the inlet ports 50 in impingement against the back side of the shield plate for cooling thereof. The impingement baffle 58 is illustrated in more detail in FIG. 6 and includes a plurality of apertures therethrough sized for producing jets of cooling air for effecting impingement cooling of the back side of the shield plate 54.

As shown in FIG. 5, the shield plate 54 is preferably disposed flush with the tube outlet 28, and the border 56 extends forwardly to engage the perimeter of the mounting flange 36. The impingement baffle 58 is spaced axially therebetween for defining an inlet chamber or plenum 60 forwardly of the impingement baffle and an outlet chamber or plenum 62 between the baffle and the shield plate. The inlet plenum 60 receives the cooling air 34 from the several inlet ports 50 for feeding the impingement baffle to internally cool the shield plate. The spent impingement air inside the outlet plenum 62 is discharged therefrom through the multiple outlet ports 52 extending into the mixer tube.

As initially shown in FIG. 3, the mixer tube 22 is preferably a thin-walled cylindrical tube for reducing its weight. The tube is locally thickened as required for providing the external threads 44 for engaging the retention nut 46. Since the nut operates to clamp the mounting flange 36 against the dome plate 40, the tube 22 preferably also includes a plurality of axial ribs 64, as shown in more detail in FIG. 5, which extend axially between the external threads 44 and the mounting flange 36.

The ribs 64 are circumferentially spaced apart from each other to define corresponding inlet troughs or channels 66 disposed in flow communication with the inlet ports 50 for channeling the cooling air thereto. The ribs 64 provide structural reinforcement of the thin walled mixer tube between its threads and mounting flange 36 so that when the nut is tightened to a suitable torque, undesirable deformation of the tube is prevented. And, the ribs also define the inlet channels 66 therebetween for feeding cooling air through the mounting flange 36 for supplying cooling air into the heat shield.

As shown in FIGS. 3 and 4, the retention nut 46 includes a perforate aft sleeve 68 which extends aft from the internal threads 48 thereof for abutting the forward side of the dome plate 40 when clamped thereagainst. When the nut is assembled to the mixer tube, the sleeve 68 surrounds the tube ribs 64, and the sleeve therefore includes a row of inlet holes 70 disposed in flow communication with the inlet channel 66 for channeling the cooling air thereto.

FIGS. 3 and 5 illustrate a preferred flowpath for channeling the cooling air 34 through the retention nut 46 and into the heat shield 24 for cooling thereof, without undesirable leakage discharge therefrom which would increase NOx emissions. More specifically, both the shield plate 54 and the border 56 are preferably brazed to the tube outlet end and the mounting flange at corresponding full perimeter braze joints 72. The braze joints 72 seal the heat shield to the mixer tube and prevent undesirable leakage of the cooling air therefrom, and also absorb the pressure and thermal loads from the heat shield. The heat shield is therefore internally cooled by the cooling air channeled therethrough. And, the heat shield may be additionally protected by providing a conventional ceramic thermal barrier coating (TBC) 74 on the exposed face of the shield plate 54.

However, a substantial temperature gradient is thusly effected from the shield plate 54, which is heated during operation, to the mounting flange 36 through which the cooling air is channeled. In order to reduce thermal strain and stress within the heat shield, the impingement baffle 58 surrounds the tube with an axial slip joint defined by a small radial gap therebetween. In this way, the impingement baffle is not attached to the outlet end of the tube and is unrestrained as the heat shield expands and contracts during operation.

In the preferred embodiment illustrated in FIG. 5, the mixer tube 22 is axially continuous between the mounting flange 36 and the outlet 28, except at the outlet ports 52. In this way, the inner bore through the heat shield is fully closed by the tube outlet end, except for the outlet ports 52 which introduce the spent impingement air into the mixer tube prior to discharge from its outlet 28.

However, since air is channeled on the outside of the mixer tube 22, and air and fuel mixture is channeled through the tube, the tube itself enjoys substantial cooling, but is subject to temperature gradients between its opposite two ends. A substantial temperature gradient exists between the tube outlet 28 and the mounting flange 36 at which the two braze joints 72 are formed.

Figure 7:
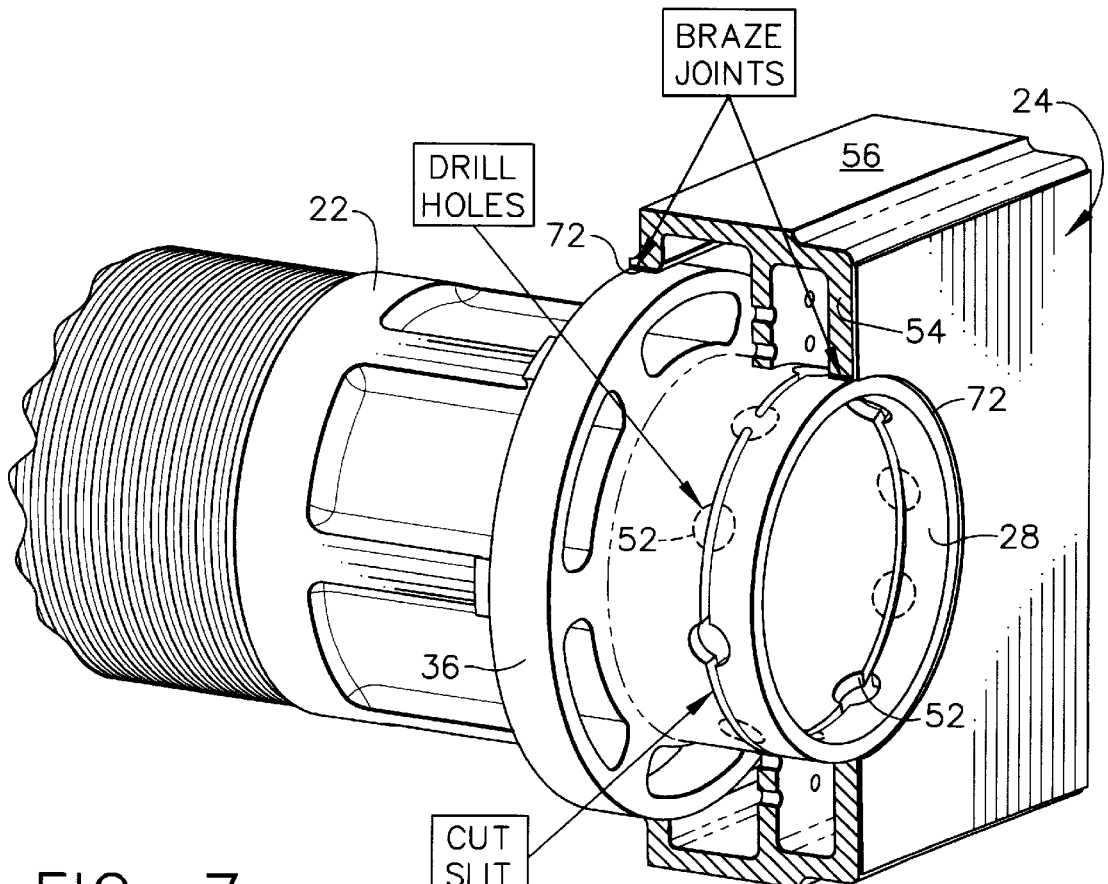
FIG. 7 is a schematic view of an exemplary method of making the dome module illustrated in FIG. 5.

In order to further increase the useful life of those braze joints 72, the tube preferably includes a circumferential gap or slit 76 as shown in an alternate embodiment illustrated in FIG. 7. The slit 76 extends circumferentially around the tube outlet end, and through the outlet ports 52 for axially severing or disconnecting the tube outlet end from the mounting flange 36. The so severed outlet end remains attached to the shield plate 54 to which it is fixedly brazed. In this way, the relatively cold tube outlet end is severed to prevent restraint on thermal expansion of the heat shield which would otherwise load the braze joints 72 and affect their useful fatigue life.

FIG. 7 also illustrates a preferred method of making the mixer tube in combination with its heat shield 24 by initially cutting the slit 76 incompletely around the tube outlet end for leaving at least one joining ligament to prevent liberation of the partially severed outlet end. The heat shield 24 may then be conventionally brazed to the mixer tube for forming the two braze joints 72 at the mounting flange and tube outlet.

The slit 76 is initially formed in an otherwise imperforate outlet end, followed in turn by drilling the outlet ports 52 in the precut slit to then completely sever or axially disconnect the tube outlet end from the mounting flange. The full complement of outlet ports 52 may be drilled by conventional electrical discharge machining (EDM), one of which outlet ports is formed directly over the initially remaining ligament which finally severs the tube outlet from the mounting flange. In this way, the severed tube outlet remains attached to the shield plate 54 but is axially disconnected from the mixer tube itself. The slit 76 may be sized to complement the outlet ports 52 so that the total flow area thereof is sufficient for discharging the spent impingement air into the severed mixer tube.

Figure 2:
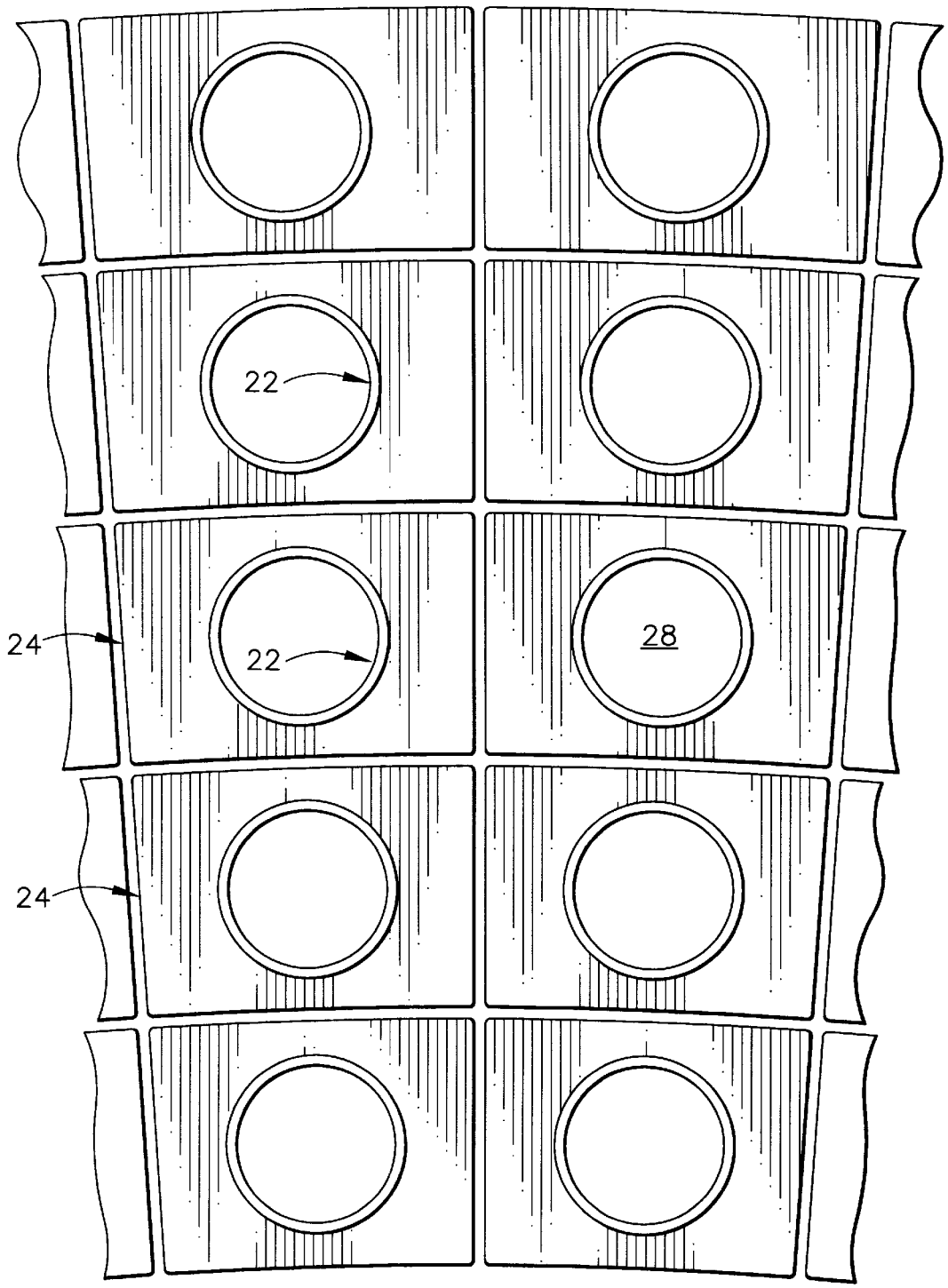
FIG. 2 is an aft-facing-forward radial end view of a portion of the modular combustor dome illustrated in FIG. 1 and taken along line 2—2.

As shown in FIG. 2, the individual combustor dome modules may be stacked together radially and circumferentially for defining the entire combustor dome with a corresponding plurality of many fuel injection sites for uniformly distributing the injected fuel for reducing exhaust emissions. The individual combustor dome modules may include identical mixer tubes 22 and retention nuts 46, with the corresponding heat shields 24 thereof being tailored in configuration for matching the required radial and circumferential position within the dome as illustrated in FIG. 2.

Since the modules are stacked radially from the engine centerline axis, the corresponding heat shields increase in circumferential width over the radial extent of the dome. Nevertheless, the basic design of each combustor dome module is identical and permits the assembly and disassembly of each individual module without obstruction from adjacent modules.

In this way, a modular combustor dome is effected, with the corresponding heat shields being tiled together for providing a substantially continuous collective heat shield facing the combustion chamber. As shown in FIG. 2, the individual modules may include respective single heat shields and tubes. Alternatively, common heat shields may be used with multiple tubes in a ganged module if desired.

The individual heat shields protect the corresponding dome modules and are internally cooled, with the spent impingement air being reintroduced into the fuel and air mixture prior to discharge from corresponding tube outlets. In this way, no spent cooling air is discharged or leaks between the tube outlet and heat shield for ensuring low NOx emissions.

The dome modules are simply cantilevered in the dome aft support plate and retained therein by the corresponding retention nuts 46. Brazing is limited to the selected portions of the individual heat shields for sealing the heat shields to the corresponding tube outlet ends and providing effective cooling thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States the invention as defined and differentiated in the following claims in which we claim:

1. A combustor dome module comprising:
   an elongate mixer tube having an inlet and an outlet coaxially aligned at opposite axial ends thereof, and a mounting flange spaced from said outlet; and
   a hollow heat shield sealingly joined around said tube between said mounting flange and tube outlet.

2. A module according to claim 1 wherein:
   said mounting flange includes a row of inlet ports disposed in flow communication with said heat shield for channeling cooling air therein; and
   said mixer tube includes a row of outlet ports disposed in flow communication with said heat shield for discharging said cooling air into said tube, upstream of said outlet thereof.

3. A module according to claim 2 wherein said heat shield comprises:
   a shield plate sealingly joined around said tube at said outlet thereof;
   a border integrally joined to the perimeter of said shield plate and sealingly joined to said mounting flange; and
   an impingement baffle extending inwardly from said border and spaced from said shield plate for channeling said cooling air from said inlet ports in impingement against said shield plate.

4. A module according to claim 3 wherein mixer tube further comprises external threads disposed between said inlet and mounting flange for receiving a retention nut.

5. A module according to claim 4 wherein said mixer tube further comprises a plurality of ribs extending between said threads and mounting flange, and circumferentially spaced apart to define corresponding inlet channels disposed in flow communication with said inlet ports for channeling said cooling air thereto.

6. A module according to claim 5 further comprising said retention nut having internal threads engaging said tube external threads, and a perforate sleeve surrounding said tube ribs and disposed in flow communication with said inlet channels for channeling said cooling air thereto.

7. A module according to claim 3 wherein both said shield plate and border are brazed to said tube outlet end and mounting flange, respectively, and said impingement baffle surrounds said tube with a slip joint thereat.

8. A module according to claim 7 wherein said tube is axially continuous between said mounting flange and outlet, except at said outlet ports.

9. A module according to claim 7 wherein said tube further comprises a slit extending circumferentially therearound and through said outlet ports for axially disconnecting said tube outlet end from said mounting flange.

10. A method of making said mixer tube according to claim 9 comprising:
    cutting said slit incompletely around said tube outlet end;
    brazing said heat shield to said tube; and
    drilling said outlet ports at said slit to disconnect said tube outlet end from said mounting flange.

11. A module according to claim 3 in combination with a perforate dome plate supporting therein said tube outlet end, with said mounting flange being disposed on one side thereof, and a retention nut surrounding said tube on an opposite side of said plate to define a combustor dome.

12. A dome according to claim 11 wherein said tube is cantilevered from said dome plate, with said tube inlet end being freely suspended therefrom.

13. A dome according to claim 12 further comprising a plurality of said modules having corresponding heat shields adjoining both radially and circumferentially in a coextensive plane.

14. A dome according to claim 13 further comprising a plurality of fuel injectors centrally suspended in corresponding inlets of said mixer tubes for injecting fuel therein with air channeled therethrough for discharge from said tube outlets.

15. A dome according to claim 14 further comprising a plurality of pilot fuel injectors surrounding said dome plate aft of said heat shields.

16. A low NOx combustor comprising:
    radially outer and inner combustion liners joined to a combustor dome to define a combustion chamber;
    said dome including a modular array of elongate mixer tubes each having a hollow heat shield sealingly joined to respective outlet ends thereof in adjoining tiled assembly thereof;
    a plurality of primary fuel injectors suspended in respective inlet ends of said tubes; and
    a plurality of pilot fuel injectors surrounding said dome at said outer liner.

17. A combustor according to claim 16 wherein said dome further comprises:
    a perforate dome plate supporting therein said tube outlet ends; and
    each of said tubes includes an integral mounting flange on one side of said dome plate, and a retention nut on an opposite side thereof for clamping each tube to said dome plate, with said tubes being cantilevered from said dome plate.

18. A combustor according to claim 17 wherein each of said heat shields comprises:
    a shield plate sealingly joined around said tube at said outlet end thereof;

a border integrally joined to the perimeter of said shield plate and sealingly joined to said mounting flange; and an impingement baffle extending inwardly from said border and spaced from said shield plate for channeling cooling air in impingement against said shield plate.

19. A combustor according to claim 18 wherein:

said mounting flange includes a row of inlet ports disposed in flow communication with said heat shield for channeling cooling air to said impingement baffle; and said mixer tube includes a row of outlet ports disposed in flow communication with said heat shield for discharging said cooling air into said tube upstream of an outlet thereof.

20. A combustor according to claim 19 wherein both said shield plate and border are brazed to said tube outlet end and mounting flange, respectively, and said impingement baffle surrounds said tube with a slip joint thereat.

* * * * *